United States Patent [19]
Dillmann

[11] 3,712,405
[45] Jan. 23, 1973

[54] VEHICLE OVERTURN PREVENTER
[76] Inventor: Eugene Roland Dillmann, 408 Ballentine Street, Waveland, Miss. 39520
[22] Filed: Dec. 10, 1971
[21] Appl. No.: 96,948

[52] U.S. Cl..................................180/104, 200/61.52
[51] Int. Cl...............................................B60r 21/02
[58] Field of Search ............180/104, 103; 200/61.52

[56] References Cited

UNITED STATES PATENTS

| | | | |
|---|---|---|---|
| 1,540,866 | 6/1925 | Samuelson et al. | 200/61.52 |
| 1,414,082 | 4/1922 | Hall | 180/104 |
| 3,071,663 | 1/1963 | Fritz | 180/104 X |
| 1,503,682 | 8/1924 | Boyrie | 180/104 |
| 3,038,151 | 6/1962 | O'Connor, Jr. et al. | 200/61.52 X |
| 3,599,745 | 8/1971 | Hughes | 180/104 |
| 2,644,051 | 6/1953 | Maloof | 200/61.52 |
| 3,258,083 | 6/1966 | Maitland | 180/104 |
| 2,067,332 | 1/1937 | Numer | 180/105 R |
| 1,843,960 | 2/1932 | Sticelber | 180/105 R |

Primary Examiner—Leo Friaglia
Assistant Examiner—John P. Silverstrim
Attorney—Alvin Edward Moore

[57] ABSTRACT

A device for preventing overturn of a tractor or other vehicle, having: a housing; within the housing an inclined weight-supporting track 10, 20 and an upright partition 9, 32; a spherical weight (the ball 11 or 18) movable on the inclined track; means to stop the vehicle-driving motor when the tractor is on a steep gradient and dangerously apt to overturn (the ignition-connected switch of FIGS. 1 to 3, the fuel valve of FIGS. 4 to 6); and a control lever 14, 22, actuated by the ball when it is moved by gravity on the track, connected to the switch (or valve) for moving it into motor-stopping position. A weighted slide optionally may be substituted for the ball, and a push button for the control lever; and instead of the mechanical connection between the fuel valve and the lever (or optional push button) a solenoid for actuating the valve and electrical connections between the solenoid, lever (or button) and the battery may be utilized.

2 Claims, 9 Drawing Figures

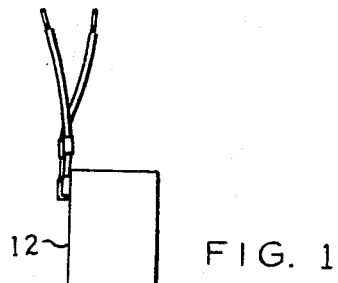
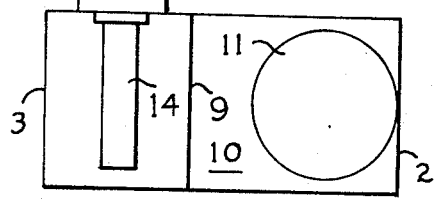
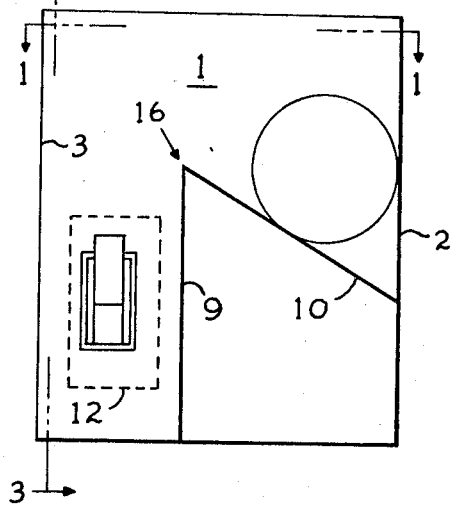
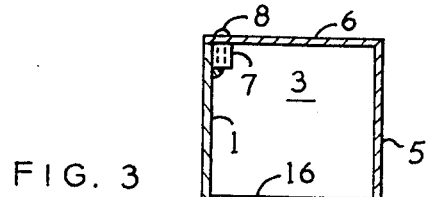
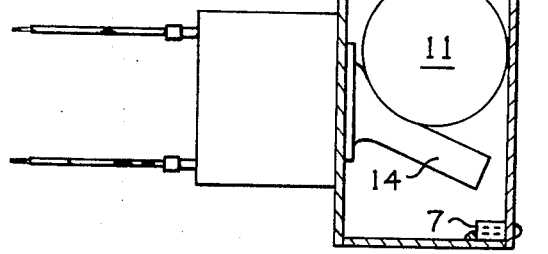
EUGENE R. DILLMANN,
INVENTOR.
BY Alvin E. Moore,
ATTORNEY.

EUGENE R. DILLMANN,
INVENTOR.

BY Alvin E. Moore,
ATTORNEY.

VEHICLE OVERTURN PREVENTER

Since tractors have come into common use a large number of tractor drivers have been badly injured or killed because these machines frequently rear up, and then continued operation of their engine and the rear part of their endless track cause them to topple over backward and onto the driver. Army half tracks and to a lesser extent than tractors some other vehicles are also sources of this danger — for example, short automobiles that climb slopes by bounce-causing roads or paths.

In view of these facts, an object of this invention is to provide means for stopping the engine or other motor when the vehicle it is propelling rears up into a dangerous angle. Some other objects are to invent: (1) a control, automatically operated when a dangerous gradient (angle of inclination) is reached that threatens overturn, to switch off electricity to the engine or other motor; and (2) a control, automatically operated when such a dangerous angle is reached to shut off fuel to a fuel-burning tractor engine or other vehicular motor.

Other objects will be apparent from the following specification and the attached drawings.

In these drawings:

FIG. 1 is a sectional view, from the plane 1—1 of FIG. 2, of the invented device with the switch on, the engine operating, and the vehicle not in a dangerous inclination;

FIG. 2 is a front elevational view of the device of FIG. 1, shown with a side plate removed;

FIG. 3 is a view in section from the plane 3—3 of FIG. 2, but showing the switch moved into off position by the ball;

Figure 4:
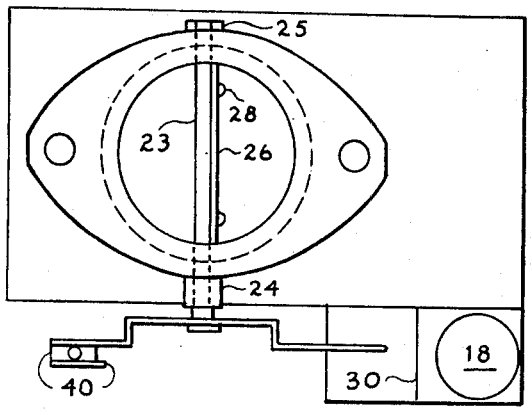
FIG. 4 is a top plan view of a second form of the invention, showing a fuel valve in open position.

In one form of the invention, shown in FIGS. 1 to 3 the control device comprises a box or housing, preferably sealed on all sides against entry of dust and water, a switch and a movable weight of heavy material (preferably a ball of steel or other heavy metal, for example, brass or lead) for actuating the switch. The housing, which has a plate or cover that may be hinged or otherwise movable to permit insertion or removal of the ball, may be of molded plastic, cast aluminum alloy, or shaped and welded sheet metal. As illustrated in FIGS. 1 to 3, it comprises: a side wall 1; the front end wall 2 and the rear end wall 3 (both, as shown optionally integral with 1); the bottom wall 4 (also optionally integral with 1); another side wall, 5; a top wall 6, shown as optionally integral with 5; lugs 7; and screws 8, for detachably fastening walls 5 and 6 to walls 1 and 4. The housing contains an interior partition, 9, and a wall 10 that is inclined to a fore-and-aft, normally horizontal plane of the vehicle. This inclined wall is a weight-supporting and weight-traversing track.

In use the housing is fixed under the hood of the vehicle and has its front wall in upright position and located forwardly of the walls 9 and 3. Normally, the weight 11 rests on the inclined wall or track 10 and against front wall 2.

The switch is fastened to the side wall 1 and has a spring-biased lever (or other spring-biased, weight-actuatable device, such as a push-button facing upward) that is located between walls 3 and 9 — to the rear of 9 and 10. Preferably, and as illustrated, this switch is of the toggle type. It comprises: switch points; the plastic case 12, fastened to the side wall 1 of the box; and the control lever 14, which preferably is longer than the usual length of such switch levers, to provide a substantial lever arm for efficient actuation of the switch by the ball. As shown in FIG. 3, an inner portion of the upper surface of this lever (a portion near the switch box) is preferably shaped to substantially conform to the surface of the ball. The spring means inside the case 12 that resists movement of the control lever is preferably weak, so as to be easily operable by the ball (or optional sliding weight). The switch points are in the electric circuit that comprises the engine ignition switch and the distributor; or optionally, in control of an electric motor, the switch 12–14 is in the circuit between the main, starting-and-stopping switch and the motor.

OPERATION OF THE DEVICE OF FIGS. 1 TO 3

Normally, the ball 11 rests on the inclined track 10, and except in crises threatening overturn the switch 12–14 remains in circuit-closing position. But as the tractor or other vehicle rears up to a dangerous angle the track 10 becomes horizontal and then tips up in a slight incline in which its junction line 16 with the top of the partition 9 is slightly lower than its junction with the wall 2. While the wall 10 is in this position the movable weight 11 rolls down track, goes over the junction 16, falls on the switch lever 14, and moves this lever into the position shown in FIG. 3. Thus the switch, actuated against its spring, opens the electrical circuit to the engine's ignition system (or to the electric motor when such is used instead of an internal combustion engine). And thus the drive of the endless tractor belt (or of the wheels in a wheeled vehicle) is stopped, and the forward end of the vehicle settles back to the ground.

Figure 5:
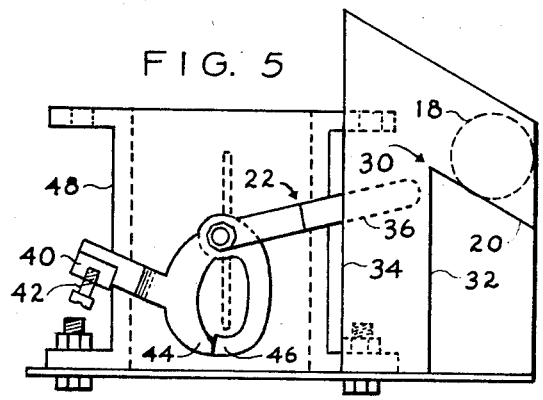
FIG. 5 is a side view of the device of FIG. 4.
Figure 6:
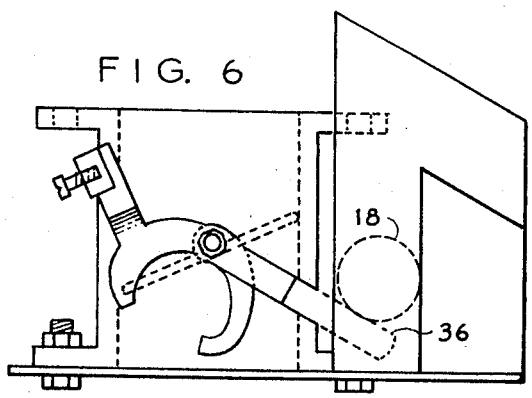
FIG. 6 is a side view of the device of FIGS. 4 and 5, showing the ball as having moved to close the valve.

The form of the invention shown in FIGS. 4 to 6 is similar to the form of FIGS. 1 to 3 in that in operation to prevent overturn a heavy metal ball 18 (or equivalent sliding weight) moves down the wall or track 20 (which temporarily has been reversed in inclination from its normal position), and falls on and actuates a control-device lever 22. But in this case: the control lever is fixed to and pivots a pin, 23, which is journaled in bearings 24 and 25; and the pin is fastened to the fuel valve 26 by the screws 28, and/or by welding. When the ball goes over the junction line 30 and falls between the partition 32 and the back wall 34 it hits the lever's forward portion 36 which projects thru an upright slot in the wall 34. The valve (which preferably is separate and spaced from the carburetor (or, in a diesel engine, from the usual throttle valve)

thus is turned to its closed position, as shown in FIG. 6; the fuel supply to the engine is thus cut off; and the engine stops. The lever also has a rearward portion which comprises an integral, U-shaped, open-topped bend 40, in which the screw 42 is adjustable, and a stop 44 that is in contact with the abutment 46 when the valve is in its open position, as shown in FIG. 5. This abutment is integral with the cast-metal valve housing 48. The screw 42 serves as a counterweight that tends to hold the valve open, with the stop 44 against abutment 46. Instead of the screw a permanently attached metal weight optionally may be used.

Figure 7:
FIG. 7 is a block diagram, illustrating the invention in its broad aspect of emergency control of either a vehicle-driving, internal-combustion engine or electric motor.
Figure 8:
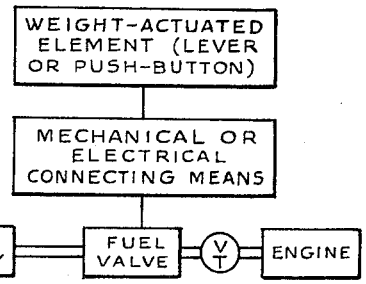
FIG. 8 is a block diagram illustrating valve-controlling means for emergency stopping of an internal combustion engine.
Figure 9:
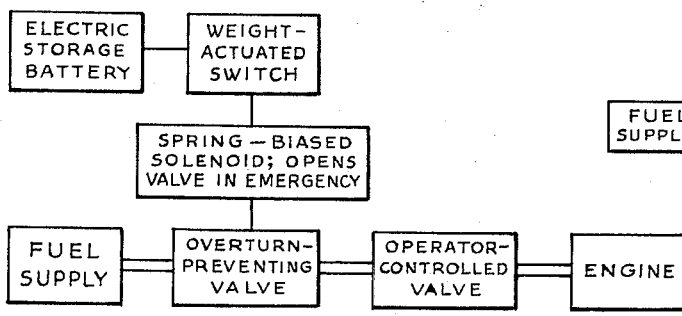
FIG. 9 is a block diagram illustrating such a control by means of a solenoid-operated valve, of an internal combustion engine (or, optionally, of a steam or other fluid motor).

The block diagrams of FIGS. 7 to 9 illustrate the invented motor-stopping device (comprising a movable weight, weight-actuated element, and electric switch and/or valve) in combination with the vehicle-driving motor and its power source. In FIG. 7, the "Vehicle Motor Assembly" may be: (1) an electric motor with any known manually-operated or automatic motor-controlling means, such as a switch and rheostat; (2) an internal combustion engine, a fuel supply, and fuel control valves, including the solenoid-operated emergency valve of this invention; or (3) an internal combustion engine, a storage battery, and an ignition system. FIG. 8 illustrates an internal combustion or diesel engine and means for stopping it on too steep a gradient by the weight-actuated lever (or push button) of this invention, combined with either mechanical or electrical means connecting the weight-actuated element with the emergency fuel valve. The operator-controlled valve is shown between the emergency fuel valve and the engine. Optionally, a steam or other fluid motor may be substituted for this engine, in which case the fuel supply and fuel valve are replaced by a source of fluid under pressure and a fluid-flow-stopping valve. FIG. 9 shows the invention as comprising a spring-biased, emergency solenoid (electromagnet) that closes a fuel valve (or optionally a pressurized-fluid valve). The "Weight-Actuated Switch" may be of the type illustrated in FIGS. 1 to 4; or it may comprise a weight-actuated push button. In operation, the solenoid preferably is electromagnetically forced against an end of a lever, such as the end portion 36 of lever 22 in FIGS. 5 and 6; and the other end of the lever is fixed to the pin 23 of the valve and turns it into the closed position of FIG. 6.

Within the scope of the following claims various changes in the specific disclosed structure may be made. For example: the upper surface of the lever 14 could be curved to approximately conform to the curvature of the ball 11 not only at the lever's end portion which is adjacent to the wall 1 (as shown in FIG. 3) but also curved for substantial conformity to the ball's surface at the lever's end portion which is adjacent to the wall 5; optionally, the end portion 36 of the lever 22 could be similarly curved to fit the curvature of the ball 18; a slidable weight may be substituted for the ball; and the ball or other weight may actuate a push-button-controlled switch.

In the claims: the word "motor" means: an internal-combustion engine; an electric motor; or fluid motor; the term "movable weight" signifies: a ball or a slidable weight; and the term "track" refers to an inclined wall or a railed track.

I claim:
1. A device for preventing overturn of a motor-driven vehicle, comprising:

a housing adapted to be rigidly fixed to a portion of said vehicle;

means, supported by said housing, for controlling the application of power to the motor of said vehicle, comprising: an engine-fuel butterfly valve having a pivoted shaft, pivotable from a motor-operating position, for application of said power, to a position stopping the power application; and means for pivoting the said valve, comprising a lever, pivotal with respect to said housing, continually and force-transmittingly connected to said pivoted shaft, having a portion on one side of said shaft and a counterweighted portion on an opposite side of the shaft; means tending to hold said valve in its motor-operating position, comprising a counterweight on said counterweighted portion, the said lever being pivotable from a position permitting said application of power to a second, emergency, power-stopping position in which said valve is moved into its power-stopping position; a movable weight, normally spaced from said lever, contacting and moving the lever into its power-stopping position when the vehicle is in a dangerous inclination; an inclined track, within and fixed to said housing, adjacent to and separate from said lever, for supporting and permitting movement of said weight, having a sufficiently large angle of inclination in a fore-and-aft plane of the vehicle to prevent movement of the weight while the vehicle is not in a dangerously steep, overturn-tending angle, the said angle of inclination being such, when said dangerously steep angle exists, to cause said weight to move on the track and into contact with said lever;

the said movable weight being constructed and arranged to have sufficient force under gravity to move said lever and valve into their power-stopping positions.

2. A device as set forth in claim 1, in which said weight is a ball.

* * * * *